Figure 1:
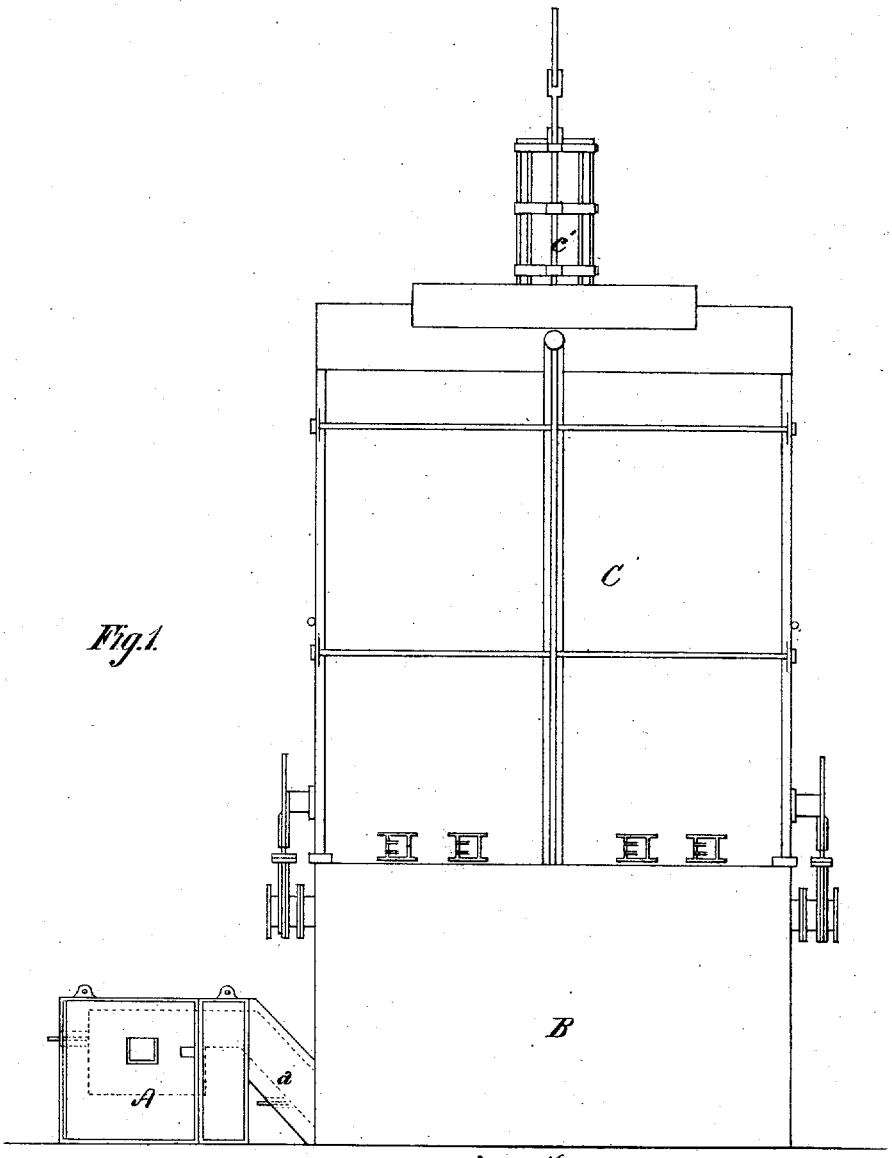

4 Sheets—Sheet 1.

J. PLAYER.

Hot Blast Stove.

No. 4,149.

Reissued Oct. 11, 1870.

Witnesses.

J. Snowden Bell.

Wm B. Dayton.

James Henderson
Jasper Maudut Lawford } Assignees.
Augusta Amelia Player
Henry McAllester Jr } Admrs of John Player deceased By their attorney.

Balomine Jr.

N. PETERS, Photo-Lithographer, Washington, D. C.

4 Sheets—Sheet 2.

J. PLAYER.

Hot Blast Stove.

No. 4,149. Reissued Oct. 11, 1870.

Witnesses.

J. Snowden Bell.

Mm. B. Dayton

James Henderson
Jasper Maudut Lawford } Assignees
Augusta Amelia Player
Henry McAllister Jr } Admrs. of John Player deceased by their attorney Henry Baldwin Jr.

N. PETERS, Photo-Lithographer, Washington, D. C.

4 Sheets—Sheet 3.

J. PLAYER.

Hot Blast Stove.

No. 4,149.

Reissued Oct. 11, 1870.

Witnesses.

J. Snowden Bell

Wm. B. Dayton.

James Henderson, Jasper Maudeul Lawford } Assignees

Augusta Amelia Player, Henry McAllister Jr. } Admrs of John Player deceased by their attorney Henry Baldwin Jr.

N. PETERS, Photo-Lithographer, Washington, D. C.

4 Sheets—Sheet 4.
J. PLAYER.
Hot Blast Stove.
No. 4,149. Reissued Oct. 11, 1870.
Fig. 7.
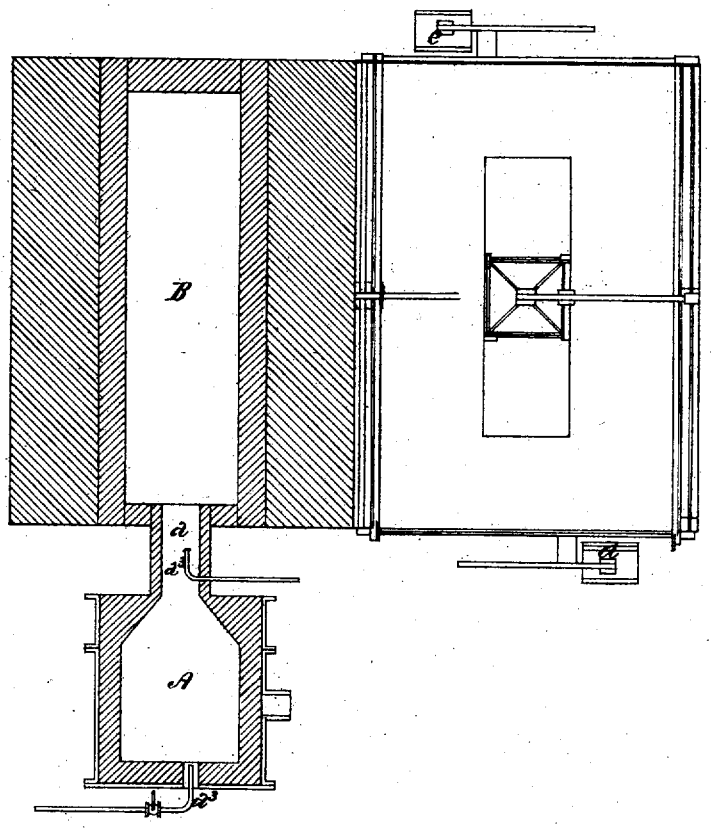
Fig. 8.
Fig. 9.
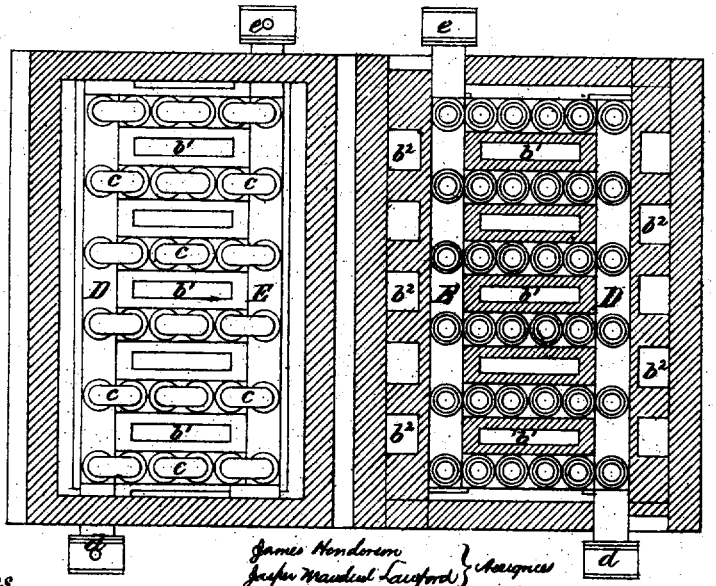
Fig. 10.
Witnesses.
J. Snowden Bell
Mm B. Dayton
James Henderson
Jasper Marshall Lawford } Assignees
Augusta Amelia Player
Henry McAllister Jr } Admrs of John Player deceased
By their attorney
Henry Baldwin
N. PETERS. Photo-Lithographer. Washington, D. C.

United States Patent Office.

JAMES HENDERSON, OF NEW YORK, N. Y., AND JASPER M. LAWFORD, OF PHILADELPHIA, PENNSYLVANIA, ASSIGNEES OF JOHN PLAYER, DECEASED.

Letters Patent No. 65,599, dated June 11, 1867; patented in England April 21, 1866; reissue No. 4,149, dated October 11, 1870.

IMPROVEMENT IN HOT-BLAST STOVES FOR BLAST-FURNACES, &c.

The Schedule referred to in these Letters Patent and making part of the same.

*To all whom it may concern:*

Be it known that JOHN PLAYER, deceased, formerly of Norton, near Stockton-on-Tees, in the county of Durham, England, and a subject of the Queen of Great Britain, late residing in the city and county of Philadelphia, in the State of Pennsylvania, in his lifetime invented an Improved Hot-Blast Stove, of which the following is a specification.

Letters Patent of the United States were granted to said JOHN PLAYER June 11, 1867, numbered 65,600, antedated March 29, 1865, for an Improvement in Apparatus for Heating the Blast for Furnaces for Smelting Iron, &c., which improvement relates to the use of waste gases without solid fuel. Many blast furnaces, however, are still worked, the blast being heated with coal-fires or other solid fuel.

It is the object of the improvement which constitutes the subject of this patent to adapt the said PLAYER'S aforesaid invention, to use in combination with a blast furnace, where the fuel used for heating the blast is coal or coke, with or without waste gases, so that all the advantages of said Player's prior improvement may be attained in such furnaces, excepting only the economy of fuel which attends the use of waste gases alone.

It had been the custom, in heating the blast in cast-iron pipes, with a coal-fire, to have the fire-place arranged under the pipes in which the blast was to be heated, so that the fire-place constituted an integral part of the so-called heating-stove. Thus arranged, the flame and smoke from the coal-fire passed directly among, and impinged directly upon, the blast-heating pipes, thereby, in addition to other objections, subjecting the pipes to an irregular and injuriously great heat, and rapidly destroying them. In some instances arches were placed over the fire-place, measurably to prevent this injury, but as the flame still played directly upon the pipes, these arches did not effect their object.

Now the said JOHN PLAYER remedied this disadvantage, and effected other improvements in heating the blast with solid fuel, by dividing the heating-stove into three separate and distinct, but communicating, compartments, namely: first, a fire-place, built, by preference, very similar to the fire-place of a puddling-furnace, and in which the coal or coke is burned; second, a combustion-chamber, immediately adjoining and freely communicating with the fire-place, into which combustion-chamber the flame, and the smoke and gases from the fuel inside the fire-place, pass, and in which the flame ignites and consumes the smoke and gases; and, third, above, and contiguous to this combustion-chamber, and separated therefrom by a thick arch of brick-work, but communicating therewith by means of narrow apertures in the arch, a second chamber, in which is placed the system of pipes through which the blast to be heated travels. This heating-chamber is of such dimensions as to leave ample spaces between and around the blast-heating pipes arranged therein, and these spaces, being at all times pervaded by a highly-heated atmosphere, in which the pipes are thus immersed, all parts of the blast-heating pipes are acted on uniformly by this surrounding and enveloping heat.

The accompanying drawings are on a scale of one-fourth of an inch to the foot, and represent a double hot-blast stove, embodying the invention herein claimed; but, the two stoves being symmetrical, and each letter of reference indicating, wherever used, the same part in either of them, the description is given as of one only.

Figures 2, 3:
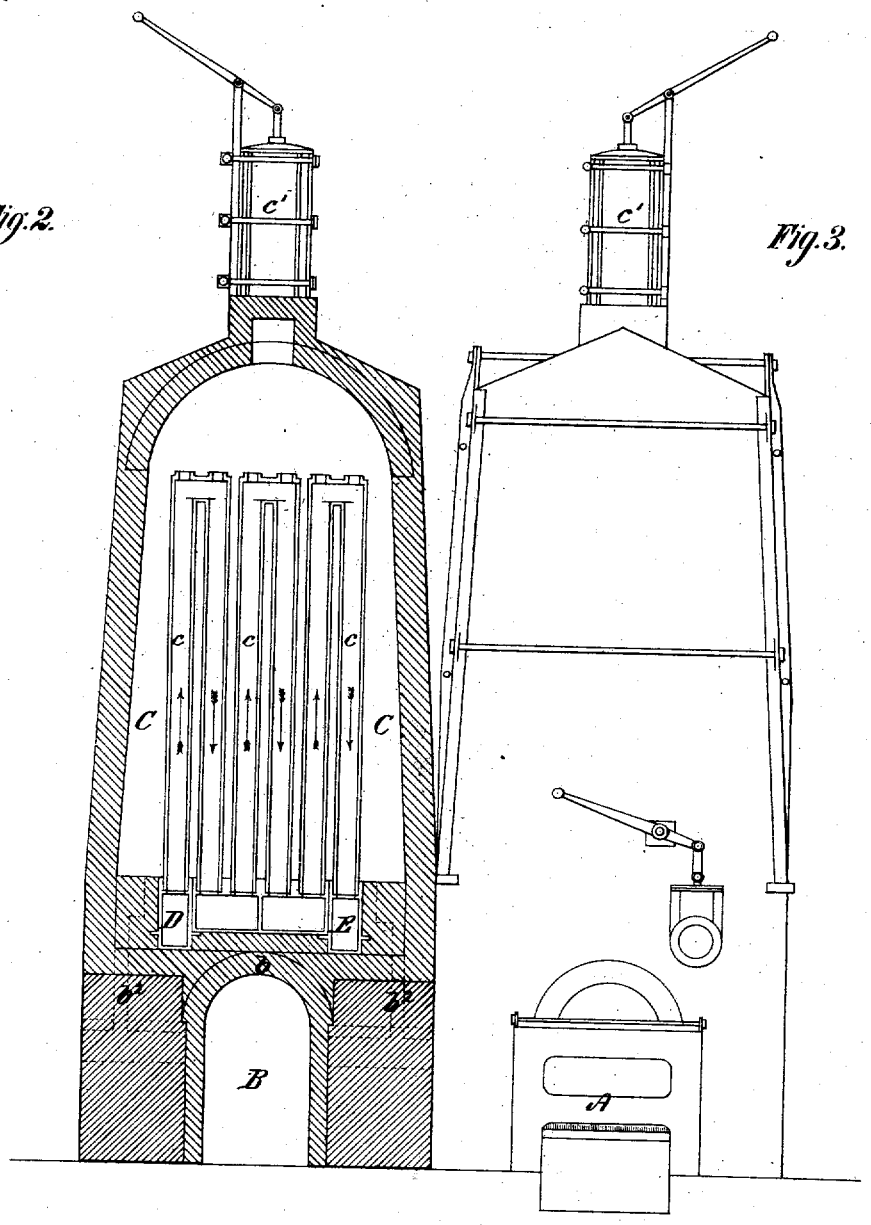
Figure 4:
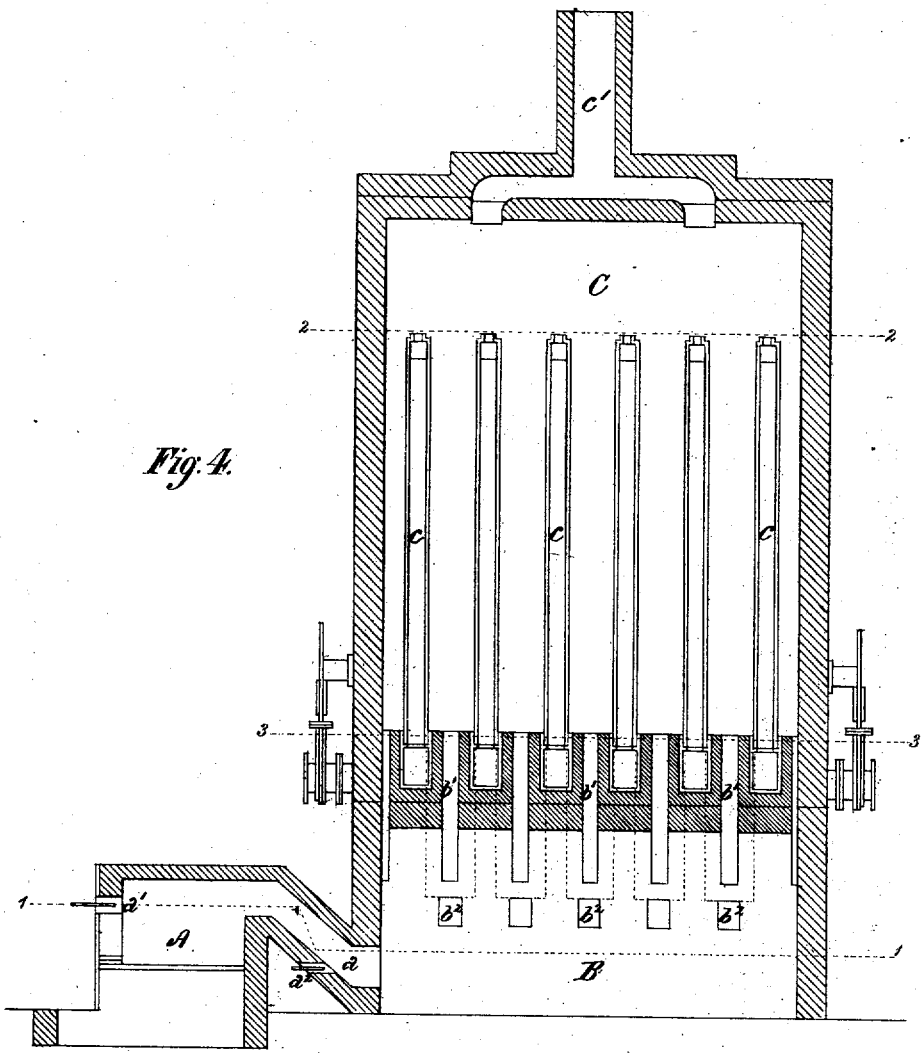
Figure 5:
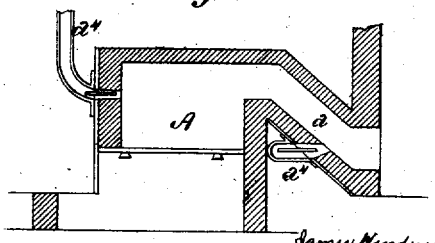
Figure 6:
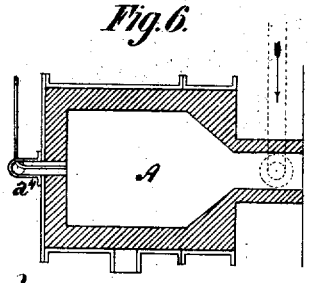

Figure 1 is a side elevation;

Figure 2, a vertical transverse section;

Figure 3, an end elevation;

Figure 4, a vertical longitudinal section;

Figure 5, a similar section through the fire-place, showing the arrangement of the steam-jets;

Figure 6, a horizontal section through the same;

Figure 7, a similar section through the line 1 1 of fig. 4.

Figure 8, a plan or top view;

Figure 9, a horizontal section through the line 2 2 of fig. 4; and

Figure 10, a similar section at the line 3 3 of fig. 4.

From the fire-place A a flue, *a*, leads the flame and smoke or gases into a combustion-chamber, B, over the top of which is a substantial fire-brick arch, *b*, forming a division or partition between the combustion-chamber and the blast-heating chamber C. The system of blast-heating pipes *c* is arranged in this chamber C, which chamber is filled without any indication of flame, with a glowing atmosphere rising from the combustion-chamber B, through narrow passages, $b^1$, in the arch *b*, and also through narrow side-passages, $b^2$, shown in dotted lines in fig. 2, and also shown in figs. 4 and 10.

A chimney, $c^1$, (fitted with a damper,) at the top of the heating-chamber C, regulates the draught.

The blast is conducted to the blast-heating pipes *c*, through a flue D, by preference of rectangular section, and provided with a regulating-valve *d*, and, after passing through the pipes, and thus becoming heated, it passes away from the stove to the blast-furnace, through a corresponding flue E.

The arrangement of the blast-flues and heating-pipes, with other details of the construction which is preferred, are very fully described in reissued Letters Patent, granted simultaneously with this patent, to James Henderson and Jasper Mauduit Lawford, upon a surrender by them of the Letters Patent of the United States granted to said JOHN PLAYER June 11, 1867; antedated March 29, 1865, as hereinbefore recited; and, as the said details form no part of the invention herein claimed, it is only necessary to refer to said reissue for these particulars.

It is preferable to use, in connection with these stoves, a jet of steam passed into the incandescent fuel in the fire-place A, (as at $a^1$ fig. 4,) or into the flame therefrom as it passes into the combustion-chamber B, (as at $a^2$ fig. 4,) so that the steam is mingled with the ignited gases in the combustion-chamber, and thereby becomes highly superheated, in which state it passes into the blast-heating chamber, and contributes to the heating of the blast-pipes arranged therein, having, moreover, in its passage into the pipe-chamber, a three-fold effect: first, it forces the gases from the fire-place A into the combustion-chamber; secondly, it mixes with the flames in the combustion-chamber, and tempers the intensity of their heat; and thirdly, it aids in carrying the heat generated in the combustion-chamber into the blast-heating chamber.

Steam-jets for a stove of the size shown in the drawing, are shown at $a^3$ fig. 7. The pressure of the steam being, say, thirty pounds to the inch, the orifices of these jets may be about from three-eighths of an inch to half an inch in diameter. Each jet is provided with a regulating-cock or valve.

Another use of this part of the invention of said PLAYER is to employ the steam-jet to draw the waste gases from the top of the blast-furnace through the stove, or to force the said gases into the blast-heating stove.

In such cases, the arrangement at the top of the blast-furnace for drawing off the gases may be similar to those heretofore employed; for instance, there may be apertures in the brick-work, a few feet below the surface of the charge, leading into a circular flue surrounding the furnace, from which flue the gas-pipe descends; or the end of the gas-pipe may simply be inserted a few feet down into the charge in the furnace.

In using the steam-jet, the stove herein described needs no modification, save the addition of branch gas-pipes, $a^4$, shown in figs. 5 and 6. These pipes have nozzles of, in this instance, about six inches in diameter, which inclose the steam-jets, which jets tend to produce a partial vacuum in the gas-pipe, which vacuum is immediately filled by the gas from the top of the blast-furnace. The gas is thus forced into the fire-place A and burnt.

The jet, instead of being inclosed by the gas-pipe, may be placed on the top of the stove, and thus create a partial vacuum therein; but in such case the gas is burned without any admixture of the steam.

What is claimed as the invention of the said JOHN PLAYER, is—

1. The combination, in a hot-blast stove, of a fire-place in which solid fuel is burned; a combustion-chamber separate from, but having free communication with, the fire-place; a blast-heating chamber, separate from both the fire-place and the combustion-chamber, but communicating with the latter; and conduits for the blast within the blast-heating chamber, but removed from the action of the ignited gases in the combustion-chamber, substantially as described.

2. The combination of a blast-furnace, a hot-blast stove, and a jet or jets of steam, substantially as and for the purposes described.

JAMES HENDERSON.
J. M. LAWFORD.
AUGUSTA A. PLAYER.
HENRY McALLISTER, JR.

Witnesses as to the signatures of JAMES HENDERSON and JASPER MAUDUIT LAWFORD:
H. G. HASHAGEN,
J. W. BOGERT.

Witnesses as to the signature of AUGUSTA AMELIA PLAYER:
JNO. McKIM,
J. M. LAWFORD.

Witnesses as to the signature of HENRY McALLISTER, JR.:
S. M. KRAUSER,
CHAS. M. ROWLEY.